United States Patent
Cochran

(10) Patent No.: US 7,670,424 B2
(45) Date of Patent: Mar. 2, 2010

(54) METHODS FOR RECLAIMING AND BENEFICIATING FLY ASH PARTICLES AND SYSTEMS THEREOF

(75) Inventor: Joseph W. Cochran, Palm Harbor, FL (US)

(73) Assignee: PMI Ash Technologies, LLC, Cary, NC (US)

( * ) Notice: Subject to any disclaimer, the term of this patent is extended or adjusted under 35 U.S.C. 154(b) by 0 days.

(21) Appl. No.: 11/655,344

(22) Filed: Jan. 19, 2007

(65) Prior Publication Data

US 2008/0173217 A1 Jul. 24, 2008

(51) Int. Cl.
*C04B 18/08* (2006.01)

(52) U.S. Cl. ........... 106/705; 106/DIG. 1; 264/DIG. 49
(58) Field of Classification Search ............... 106/705, 106/DIG. 1; 264/DIG. 49
See application file for complete search history.

(56) References Cited

U.S. PATENT DOCUMENTS

| | | | |
|---|---|---|---|
| 2,546,570 A | 3/1951 | Vance | |
| 2,576,565 A | 11/1951 | Brown | |
| 3,328,180 A | 6/1967 | Ban | |
| 3,799,474 A | 3/1974 | Scharzler | |
| 3,825,501 A | 7/1974 | Muenger | |
| 3,859,799 A * | 1/1975 | Jaco, Jr. ............... | 588/259 |
| 3,979,168 A | 9/1976 | Chauvin | |
| 4,003,986 A | 1/1977 | Lewis, Jr. | |
| 4,034,063 A | 7/1977 | Rosar et al. | |
| 4,043,831 A | 8/1977 | Friedman | |
| 4,064,219 A | 12/1977 | Yamashita et al. | |
| 4,121,945 A | 10/1978 | Hurst et al. | |
| 4,304,659 A | 12/1981 | Pratt et al. | |
| 4,325,833 A | 4/1982 | Scott | |
| 4,341,623 A | 7/1982 | Bertolacini et al. | |
| 4,705,409 A | 11/1987 | Trerice | |
| 4,911,900 A | 3/1990 | Horch et al. | |
| 4,959,334 A | 9/1990 | Mauleon et al. | |
| 5,051,245 A | 9/1991 | Wilson et al. | |
| 5,066,627 A | 11/1991 | Owen et al. | |
| 5,069,720 A | 12/1991 | Epperly et al. | |
| 5,160,539 A * | 11/1992 | Cochran ............... | 106/405 |
| 5,273,727 A | 12/1993 | Johnson | |
| 5,390,611 A * | 2/1995 | John ............... | 110/165 A |

(Continued)

FOREIGN PATENT DOCUMENTS

DE    26 11 213 A    3/1976

(Continued)

OTHER PUBLICATIONS

Vincent M. Giampa, Ammonia Removal from Fly Ash by Carbon Burn-Out, 2000 Conference on Unburned Carbon on Utility Fly Ash, National Energy Technology Laboratory, Department of Energy, St. Petersburg, FL.

(Continued)

*Primary Examiner*—Paul Marcantoni
(74) *Attorney, Agent, or Firm*—Nixon Peabody LLP

(57) ABSTRACT

A method and system for reclaiming and beneficiating fly ash particles includes recovering at least a portion of fly ash particles from reclaimed feed and supplying at least a portion of the recovered fly ash particles to at least one mixing reactor with a chamber where at least a portion of the supplied fly ash particles are thermally beneficiated.

10 Claims, 2 Drawing Sheets

U.S. PATENT DOCUMENTS

| | | | |
|---|---|---|---|
| 5,399,194 A * | 3/1995 | Cochran et al. | 106/405 |
| 5,525,317 A | 6/1996 | Bhat et al. | |
| 5,837,052 A * | 11/1998 | Oates et al. | 106/705 |
| 5,846,313 A * | 12/1998 | Chuang | 106/705 |
| 6,077,494 A | 6/2000 | Gasiorowski et al. | |
| 6,202,573 B1 * | 3/2001 | Bachik | 110/165 A |
| 6,290,066 B1 | 9/2001 | Hwang | |
| 6,422,392 B1 | 7/2002 | Levy | |
| 6,605,263 B2 | 8/2003 | Alix et al. | |
| 6,746,654 B2 | 6/2004 | Mehta et al. | |
| 6,755,901 B1 | 6/2004 | Ramme et al. | |
| 6,783,585 B2 | 8/2004 | Zacarias et al. | |
| 6,790,264 B2 | 9/2004 | Minkara | |
| 6,863,875 B1 * | 3/2005 | Kotake et al. | 423/235 |
| 7,223,375 B1 | 5/2007 | Cochran et al. | |
| 2002/0189497 A1 | 12/2002 | Tranquilla | |
| 2003/0202927 A1 | 10/2003 | Minkara et al. | |
| 2004/0033184 A1 | 2/2004 | Greer | |
| 2004/0069186 A1 | 4/2004 | Zacarias et al. | |
| 2007/0193476 A1 | 8/2007 | Cochran et al. | |

FOREIGN PATENT DOCUMENTS

| | | |
|---|---|---|
| DE | 35 26 756 A1 | 7/1985 |
| DE | 38 02 844 A1 | 11/1987 |
| EP | 0 227 196 B1 | 1/1987 |
| JP | 590592337 A | 4/1984 |
| SU | 734162 | 5/1978 |

OTHER PUBLICATIONS

Vincent M. Giampa, Ammonia Removal from Coal Fly Ash by Carbon Burn-Out, 2001 Conference on Selective Catalytic Reduction (SCR) and Selective Non-Catalytic Reduction (SNCR) for NOx Control, National Energy Technology Laboratory, Department of Energy, St. Petersburg, FL.

Cheminfo: Ammonia Gas, Chemical Profiles Created by CCOHS, Canadian Centre for Occupational Health and Safety, www.worksafesask.ca/files/ccohs/cheminfo/cie48.html, printed Mar. 10, 2006.

Vincent M. Giampa, Ammonia Removal from Coal Fly Ash by Carbon Burn-Out, NETL Conference Proceedings, 2001, Pittsburg, Pa, www.progressfuels.com/cbo/AmmoniaRemoval.html, printed Jun. 2, 2005.

W.Braker et al., Matheson-Gas Products, Matheson Gas Data Book 6th Edition, 1980, pp. 23-29.

Compressed Gas Association, Handbook of Compressed Gases 3Rd Edition, 1990, pp. 231-252, Van Nostrand Reinhold Co.

T.A. Czuppon et al., Ammonia, Kirk-Othmer Encyclopedia of Chemical Technology 4th Edition, 1992, pp. 678-710, vol. 2, John Wiley & Sons.

Kevin P. Resnik et al., Aqua Ammonia for Simultaneous Removal of CO2, S02, and No., Department of Energy, National Energy Technology Laboratory, Published: International Journal of Environmental Technology and Management, 2004, vol. 4 Nos. 1/2.

Frequently Asked Questions: American Coal Ash Association, website: www.acaa-usa.org/FAQ.htm, printed Jun. 1, 2005.

Ammonia, Environmental and Technical Information for Problem Spills, Jul. 1984, pp. 1-14, Technical Services Branch, Environmental Protection Service, Ottawa, ON, Canada.

Answer 296 of 406 of Chem Abstracts on STN, DE 3802884 (Hilgraf) Aug. 10, 1989 (abstract only).

Answer 327 of 406 of Chem Abstracts on STN, DE 3526756 (Ruetten et al.) Jan. 28, 1997 (abstract only).

"Combustion: Fossil Power Systems," published by Combustion Engineering, Inc., 3rd Edition, 1981, p. 24-22, 24-23.

ASTM C618-05 "Standard Specification for Coal Fly Ash and Raw of Calcined Natural Pozzolan for Use in Concrete."

"Treatment of Mercury in Fly Ash by the CBO Process," by Joe Cochran and Vincent Giampa, Research Disclosure Journal, Jun. of 2003.

Answer 361 of 406 of Chem Abstracts on STN, JP57053224 (Electric Power DvIpmt) Mar. 30, 1982 (abstract only).

* cited by examiner

METHODS FOR RECLAIMING AND BENEFICIATING FLY ASH PARTICLES AND SYSTEMS THEREOF

FIELD OF THE INVENTION

This invention generally relates to methods and systems for processing fly ash particles and, more particularly, to methods for reclaiming and beneficiating fly ash particles and systems thereof.

BACKGROUND

During the process of burning coal in utility or large industrial furnaces, fly ash particles are produced. These fly ash particles constitute about 10% of the total weight of the coal burned and fly ash historically was considered a waste product which was collected and shipped to designated land fill sites for disposal. Depending upon the particular type of coal which was burned, the fly ash particles could contain mineral content which made disposal difficult and expensive.

As disclosed in U.S. Pat. Nos. 5,160,539 and 5,399,194, which are each herein incorporated by reference in their entirety, techniques to utilize these fly ash particles for a beneficial purpose have been developed. More specifically, these patents disclose systems and methods for using combustion processes to thermally beneficiate fly ash particles by reducing the carbon content. The fly ash particles beneficiated by these inventions can be used as a substitute for a portion of Portland cement.

Unfortunately, prior to the development of the above-identified techniques, substantial amounts of fly ash particles had already been disposed of in designated landfill sites. Additionally, despite these breakthroughs substantial amounts of fly ash particles from coal burning plants that do not utilize this technology continue to be disposed of in designated landfill sites. Unfortunately, the high moisture content of landfill fly ash gives it physical properties that make it unusable as a feed material for the above-identified techniques as well as for other competing fly ash beneficiation techniques. To date, no commercially viable techniques to reclaim and beneficiate the fly ash particles which have been disposed of in these landfills have been developed.

SUMMARY

A method for reclaiming and beneficiating fly ash particles in accordance with embodiments of the present invention includes recovering at least a portion of fly ash particles from reclaimed feed where reclaimed feed refers to material reclaimed from one or more fly ash landfills which becomes feed material for the present invention. At least a portion of the recovered fly ash particles is supplied to at least one mixing reactor with a chamber and at least a portion of the supplied fly ash particles in the chamber are beneficiated.

A system for reclaiming and beneficiating fly ash particles in accordance with other embodiments of the present invention includes a reclaim system, a supply system, and a beneficiation system. The reclaim system recovers at least a portion of fly ash particles from reclaimed feed and the supply system provides at least a portion of the recovered fly ash particles to at least one mixing reactor with a chamber. The beneficiation system comprises the at least one mixing reactor with the chamber that beneficiates at least a portion of the supplied fly ash particles.

A method for making a system that reclaims and beneficiates fly ash particles in accordance with other embodiments of the present invention includes providing a reclaim system that recovers at least a portion of fly ash particles from reclaimed feed. A supply system is connected to the reclaim system and to at least one mixing reactor with a chamber to provide at least a portion of the recovered fly ash particles. A beneficiation system comprising the at least one mixing reactor with the chamber is provided that beneficiates at least a portion of the supplied fly ash particles.

Accordingly, as described herein the present invention provides an effective method and system for reclaiming and beneficiating fly ash particles from reclaimed feed from one or more disposal sites. With the present invention, previously unusable fly ash particles at a disposal site can now be reclaimed and beneficiated into a commercially viable product. Additionally, with the present invention landfill sites with fly ash particles which contain undesirable content can be effectively and economically removed from the landfill site.

DETAILED DESCRIPTION

Figure 1:
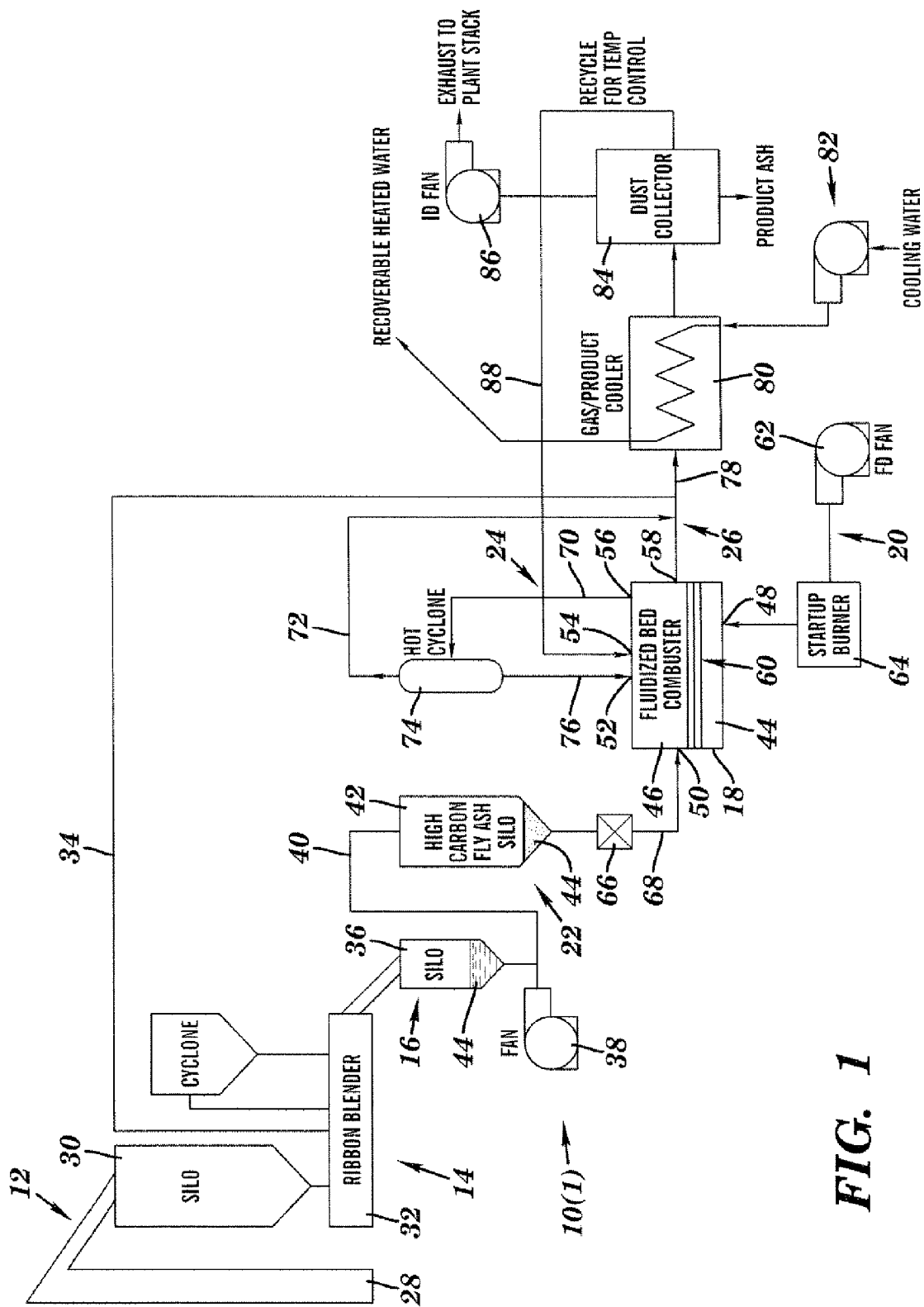
FIG. 1 is a block diagram of a fly ash beneficiation system which reclaims fly ash in accordance embodiments of the present invention.

A system 10(1) for reclaiming and beneficiating fly ash particles in accordance with embodiments of the present invention is illustrated in FIG. 1. The system 10(1) includes a reclaimed feed supply system 12, a mixing system 14, a reclaimed fly ash particle delivery system 16, a fluid bed reactor 18, a fluid supply system 20, a fly ash injection system 22, an exhaust system 24, and an outflow system 26, although the fly ash beneficiation system 10(1) can comprise other numbers and types of components in other configurations, such as those shown in FIG. 2. The present invention provides an effective system and method for reclaiming and beneficiating fly ash particles from reclaimed feed from one or more disposal sites.

Referring more specifically to FIG. 1, the reclaimed feed supply system 12 includes a bucket elevator 28 and a silo 30, although the reclaimed feed supply system 12 can comprise other numbers and types of devices in other configurations. With the present invention, the reclaimed feed is dug out of one or more fly ash disposal sites and is transported to the bucket elevator 28 for deposit into silo 30, although the reclaimed feed can be obtained in other manners and other manners for transporting and storing the reclaimed feed can be used. Typically, the reclaimed feed includes fly ash particles and at least one other material, such as water, which is not a by product of the coal burning process, although the reclaimed feed can have other compositions.

The mixing system 14 includes a ribbon blender 32, although the mixing system can comprise other types and numbers of mixing or separating devices in other configurations can be used. The ribbon blender 32 is connected to receive the reclaimed feed from the silo 30 and is used to separate the fly ash particles which are often clumped together due to the moisture content of the landfill fly ash. Additionally, a line 34 is used to supply heated gases and beneficiated fly ash particles 44 to the ribbon blender 32 to provide heat which is used to dry the reclaimed feed and separate the fly ash particles.

The reclaimed fly ash particle delivery system 16 includes a collection silo 36, a blower 38 and a transport system, although the delivery system 16 can comprise other numbers and types of devices in other configurations. When a valve in the collection silo 30 is opened, fly ash particles 44 are gravity fed into the transport system and air or other gases from the blower transport the fly ash particles 44 via the line 40 to the silo 42 or other storage device.

The fluid bed reactor 18 is a dry bubbling fluid bed which is used in the beneficiation of fly ash particles 44, although other types and numbers of well mixed reactors can be used. The fluid bed reactor 18 includes a chamber 46 inlets 48, 50, 52, and 54, and outlets 56 and 58, although the chamber 46 can have other numbers and types of inlets and outlets and also other numbers of internal compartments.

The fluid supply system 20 provides air which may be heated during process startup or as otherwise needed to the chamber 46 of the reactor 18 to fluidize the fly ash particles 44 in the chamber 46 and create a fluid bed 60, although the fluid supply system 20 can provide other types of fluids which may or may not be heated to the chamber 46. In these particular embodiments, the temperature of the fluid bed 60 is controlled by one of several known means to about 1375° F. or below, although the fluid bed can be operated at other temperatures, such as a fluid bed 60 temperature of about 1550° F. or below. The fluid supply system 20 includes a forced draft fan 62 and an air pre-heater 64, although the fluid supply system 20 can comprise other numbers and types of components in other configurations and other types of fluid supply systems can be used. An outlet of the forced draft fan 62 is connected to an inlet of the air pre-heater 64 and an outlet of the air pre-heater 64 is connected to the inlet 48 of the reactor 18, although other configurations can be used.

The fly ash injection system 22 provides and regulates the flow of the fly ash particles 44 to the chamber 46 in the reactor 18, although other configurations for supplying the fly ash particles 44 can be used. In this particular embodiment, fly ash particles which are a byproduct of burning coal and fly ash particles from reclaimed feed comprise the fly ash particles 44, although fly ash particles 44 can be provided from a single source or from other combinations of sources. The fly ash particles 44 have an average size range between about 0.01 mm and 0.025 mm and, after processing, have no more than about 32% of the particle mass retained on a 0.045 mm wet sieve to be suitable for further commercial use, although the size range of the fly ash particles 44 can vary. In this example, the fly ash particles 44 have an average diameter of about 0.02 mm, although the fly ash particles 44 can have other dimensions.

The fly ash injection system 22 includes the silo 42, a feeder 66, and a feed line 68, although the fly ash injection system 22 can comprise other numbers and types of components in other configurations, such as multiples bins which each supply fly ash particles 44 to the chamber 46. The feeder 66 is located in and controls the rate at which fly ash particles 44 are supplied in the feed line 68 which is connected between the silo 42 and the inlet 50 to the chamber 46, although other configurations can be used.

The exhaust system 24 exhausts one or more gases and fly ash particles 44 from the outlet 56 in the chamber 46, collects fly ash particles 44 in the exhaust gas or gases, and gravity feeds the collected fly ash particles 44 back to the chamber 46, although other configurations for the circulation system 20 can be used. The exhaust system 24 includes exhaust lines 70 and 72, dust collector 74, such as a cyclone, bag house, electrostatic precipitator or other dust collection device, and a return line 76, although the circulation system 20 can comprise other numbers and types of components in other configurations. The exhaust line 70 is connected between the outlet 56 and an inlet to the dust collector 74. The return line 76 is connected between the dust collector 74 and inlet 52 to the chamber 46, although other configurations and manners for capturing and reintroducing fly ash particles 44 can be used. The other exhaust line 72 is connected to the dust collector 74 and exhausts emissions of the gas or gases resulting from the beneficiation of the fly ash particles 44 to the outflow line 78.

The outflow system 26 outputs the beneficiated fly ash particles which are now suitable for other applications, such as a replacement for a portion of the cement in concrete. The outflow system 26 includes the outflow line 78 which is connected to the outlet 58 and to the exhaust line 72, a gas/product cooler system 80, a cooling water supply 82, a dust collector system 84, and an induced draft (ID) fan system 86, although outflow system 26 can comprise other numbers and types of components in other configurations. The beneficiated fly ash particles and gases are supplied by the outflow line 78 to the gas/product cooler system 80. The gas/product cooler system 80 receives a supply of cooling water from water supply 82 which is used to cool the beneficiated fly ash particles and gases, although other fluids and/or cooling systems could be used. The cooled beneficiated fly ash particles and gases are output from the cooler system 80 to the dust collector system 84 which separates and outputs the beneficiated fly ash particles and exhausts the gases with the assistance of the ID fan system 86. A portion of the beneficiated fly ash particles are fed back to the chamber 46 via line 88 to the inlet 54 to help control and regulate the temperature in the fluid bed 60. In these embodiments, the temperature in the fluid bed 60 in the chamber 46 is at or below about 1375° F., although the fluid bed 60 in the chamber 46 can be operated at other temperatures.

Figure 2:
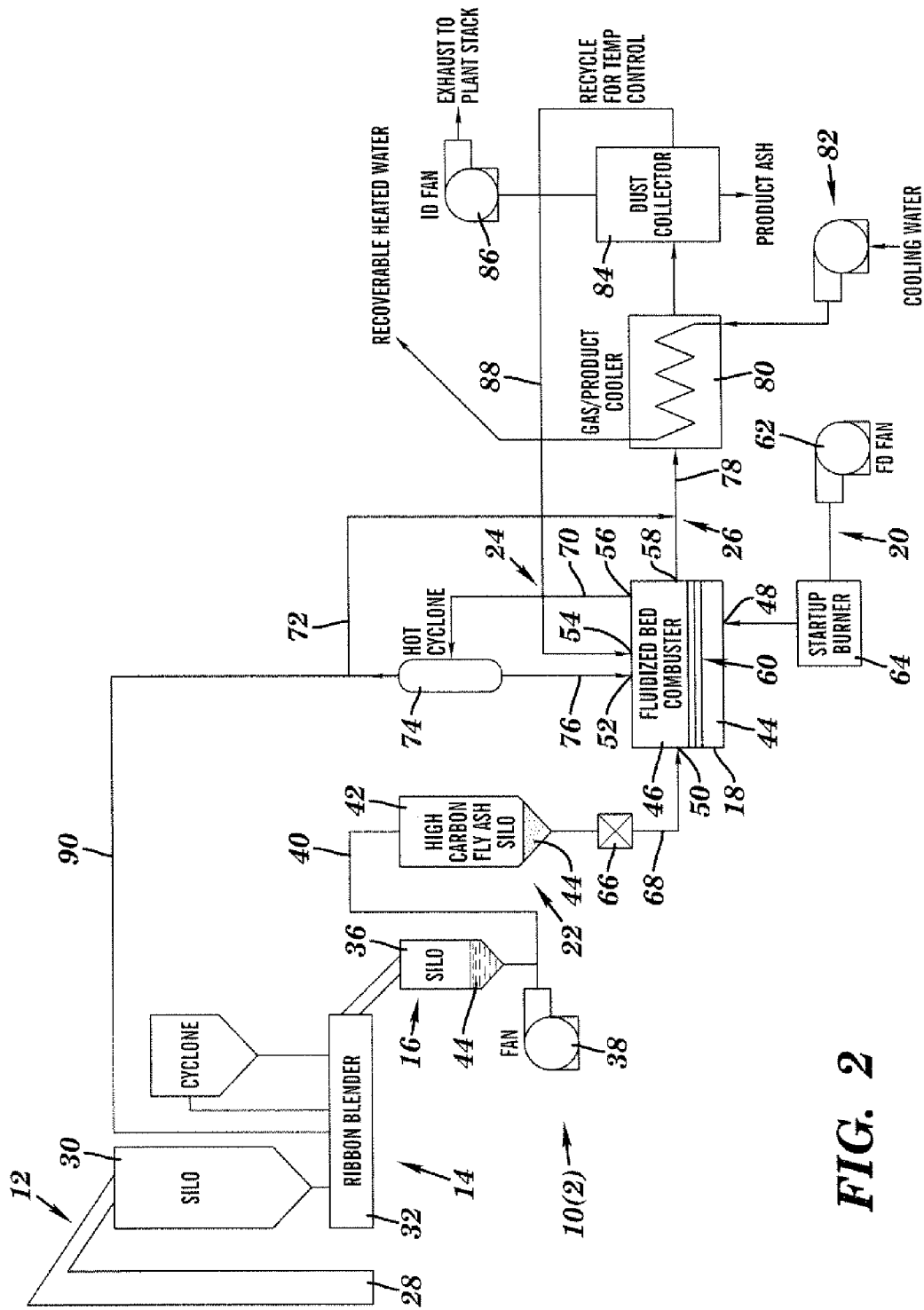
FIG. 2 is a block diagram of a fly ash beneficiation system which reclaims fly ash in accordance other embodiments of the present invention.

The fly ash beneficiation system 10(2) shown in FIG. 2 is identical to the fly ash beneficiation system 10(1) shown in FIG. 1, except as described herein. Elements in FIG. 2 which are like those shown in FIG. 1 will have like reference numerals. In this embodiment, the exhaust line 72 is connected via a line 90 to the ribbon blender 32 to supply exhaust gas to provide heat which is used to dry and separate fly ash particles in the reclaimed feed, instead of connecting the gases and beneficiated fly ash particles in the chamber 46 via the outflow line 78 to the ribbon blender 32.

The operation of the fly ash beneficiation system 10(1) will now be described with reference to FIG. 1. Reclaimed feed is dug out or otherwise obtained from one or more disposal sites and is transported to the beneficiation system 10(1), although the reclaimed feed can be obtained in other manners. Typically, the reclaimed feed includes fly ash particles 44 and at least one other material, such as water which is not a byproduct of the coal burning process, although the reclaimed feed can have other compositions.

In this particular embodiment, the reclaimed feed is transferred from the truck into a bucket elevator 28 which transports the reclaimed feed into a silo 30, although other manners for transporting and storing the reclaimed feed can be used. When a feeder in the silo 30 is operated, the reclaimed feed is supplied to a ribbon blender 32 which is rotated to break apart the fly ash particles 44 in the reclaimed feed which are often clumped together due to the moisture content of the landfill fly ash, although other types of mixing or separating systems could be used. Additionally, in this particular embodiment gases and fly ash particles 46 from the fluid bed reactor 18 are supplied via line 34 to the ribbon blender 32 to provide heat which is used to dry and separate the fly ash particles, although other manners for drying the reclaimed feed could be used.

The separated and dried fly ash particles in the reclaimed feed are transferred to a silo 36, although these fly ash particles could be stored in other types of devices or fed directly to the fluid bed reactor 18. When a feeder in the silo 36 is operated, the reclaimed feed is directed by forced air or other gases by fan 38 via line 40 to the silo 42, although these fly ash particles 44 could be transferred in other manners to other locations.

Fly ash particles 44 are introduced from the bin 42 via feed line 68 into the chamber 46 of the fluid bed reactor 18 via inlet 50. The rate at which the fly ash particles 44 are supplied is controlled by feeder 66, although other manners for supplying and metering the flow of the fly ash particles 44 into the chamber 46 can be used.

Air is drawn in by fan 62 and may be heated by pre-heater 64 to the desired temperatures for start-up or as otherwise desired, although pre-heating is not required during operation and other types of fluids could be used. The air is supplied to the inlet 48 in the chamber 46 and causes fluidization and mixing of the fly ash particles 44 in the chamber 46. Fan 62 supplies the air into chamber 46 at a superficial velocity (the actual upward air velocity at the fluid bed operating temperature and pressure if no fly ash particles 44 were present) of at least about 0.5 feet per second, but less than 1.5 feet per second.

As the fly ash particles 44 travel through fluid bed 60 in chamber 46, they intimately mix with the air being forced up through the inlet 48. Oxygen within the air chemically reacts with the fly ash particles 44 to oxidize a portion of the carbon therein and thereby reduce the carbon content of the fly ash particles 44. Oxidation of carbon produces heat. The chamber 46 is sized and the level of fluid bed 60 is controlled so that the fly ash particles 44 have a residence time in the fluid bed 60 of at least two minutes, although the residence can vary based on the particular application.

The hot gases and some of the fly ash particles 44 rise within chamber 46 and circulate out through the outlet 56 into exhaust line 70 and up to the dust collector 74. The dust collector 74 separates the predominance of the fly ash particles 44, which are typically of a dust-like character, from the exhausted gas or gases. The fly ash particles 44 collected in the dust collector 74 are gravity fed back to the chamber 46 via return line 76 into inlet 52 of chamber 46. The rate at which the collected fly ash particles 44 from dust collector 74 reenter chamber 46 can be metered. The exhaust gas or gases pass out of the dust collector 74 into another exhaust line 72 which is coupled to the outflow line 78 to mix with the beneficiated fly ash particles being expelled at outlet 58.

The beneficiated fly ash particles exit fluid bed 60 in chamber 46 through outlet 58 into outflow line 78 to the gas/ product cooler system 80. The beneficiated fly ash particles and gases are cooled by the gas/product cooler system 80 which receives cooling water from cooling water system 82, although other fluids and/or cooling systems could be used. The cooled beneficiated fly ash particles and gases are output from the cooler system 80 to the dust collector system 84 which separates and outputs the beneficiated fly ash particles and exhausts the gases with the assistance of the ID fan system 86. A portion of the beneficiated fly ash particles are fed back to the chamber 46 via line 88 to inlet 54 to help control and regulate the temperature in the fluid bed 60. In these embodiments, the temperature in the fluid bed 60 in the chamber 46 is at or below about 1375° F., although the fluid bed 60 in the chamber 46 can be operated at other temperatures.

The product fly ash beneficiated by the present invention has a sufficiently low carbon content to permit it to be used, without further processing, as a replacement for a portion of the cement in concrete or for other applications, such as mineral filler or as an addition to concrete to give the concrete better properties. In these embodiments, the beneficiated product fly ash has a carbon content of less than approximately 6% and often less than 2%, although the percentage of carbon content in the beneficiated product fly ash can vary.

The operation of the fly ash beneficiation system 10(2) shown in FIG. 2 is identical to the operation of the fly ash beneficiation system 10(1) shown in FIG. 1, except as described herein. In this particular embodiment, exhaust gases from exhaust line 72 are supplied via line 90 to the ribbon blender 32 to provide heat which is used to dry and separate the fly ash particles, although other manners for drying the reclaimed feed could be used.

Accordingly, the present invention provides an effective system and method for reclaiming and beneficiating fly ash particles from reclaimed feed from one or more disposal sites. With the present invention, previously unusable fly ash particles can now be reclaimed and beneficiated into a commercially viable product, such as a substitute for a portion of Portland cement. Additionally, with the present invention landfill fly ash particles which may contain undesirable content can be effectively and economically removed from the landfill site.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for reclaiming and beneficiating fly ash particles, the method comprising:

recovering at least a portion of landfill fly ash particles from reclaimed feed previously disposed in at least one landfill site, the reclaimed feed comprising the fly ash particles and at least one non-by product of coal burning resulting from the disposal at the at least one landfill site;

supplying at least a portion of the recovered fly ash particles to at least one mixing reactor with a chamber; and thermally beneficiating at least a portion of the supplied fly ash particles in the chamber.

2. The method as set forth in claim 1 wherein the recovering further comprises:

mixing the reclaimed feed to at least partially separate the fly ash particles; and heating the reclaimed feed with other fly ash particles and at least one gas obtained from the chamber to dry the fly ash particles prior to the thermally beneficiating.

3. The method as set forth in claim 1 wherein the recovering further comprises:

mixing the reclaimed feed to at least partially separate the fly ash particles; and heating the reclaimed feed with an exhaust gas from the beneficiating at least a portion of the supply fly ash particles in the chamber to dry the fly ash particles prior to the thermally beneficiating.

4. The method as set forth in claim 1 wherein the recovering further comprises digging out the reclaimed feed from the landfill site, wherein the reclaimed feed includes content dug from the landfill site.

5. The method as set forth in claim 1 wherein the supplying further comprises supplying at least one gas to direct the at least the portion of the recovered fly ash particles to the chamber.

6. The method as set forth in claim 1 wherein the beneficiating further comprises providing at least one fluid to the chamber for the beneficiating.

7. The method as set forth in claim 6 wherein the beneficiating further comprises heating the at least one fluid at least during a startup period.

8. The method as set forth in claim 1 further comprising providing fly ash particles from at least one other source for the beneficiating.

9. The method as set forth in claim 1 wherein an operating temperature of a fluid bed of the at least the portion of the recovered fly ash particles is at or below about 1375° F.

10. The method as set forth in claim 1 wherein the at least one non-by product of coal burning comprises water and the fly ash particles are wet and the recovering further comprises removing the water from the fly ash particles.

\* \* \* \* \*